US012423185B2

(12) United States Patent
Eberlein et al.

(10) Patent No.: US 12,423,185 B2
(45) Date of Patent: Sep. 23, 2025

(54) CONSISTENT RESTORE ACROSS MICROSERVICE PERSISTENCIES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 18/581,914

(22) Filed: Feb. 20, 2024

(65) Prior Publication Data

US 2025/0265154 A1   Aug. 21, 2025

(51) Int. Cl.
*G06F 11/14* (2006.01)

(52) U.S. Cl.
CPC .... *G06F 11/1415* (2013.01); *G06F 2201/805* (2013.01)

(58) Field of Classification Search
CPC .............. G06F 11/1415; G06F 2201/805
See application file for complete search history.

(56) References Cited

U.S. PATENT DOCUMENTS

| | | | |
|---|---|---|---|
| 8,356,010 B2 | 1/2013 | Driesen | |
| 8,924,384 B2 | 12/2014 | Driesen et al. | |
| 9,336,227 B2 | 5/2016 | Eberlein et al. | |
| 9,639,448 B2 | 5/2017 | Gebhard et al. | |
| 9,720,994 B2 | 8/2017 | Driesen et al. | |
| 9,767,424 B2 | 9/2017 | Biewald et al. | |
| 9,858,309 B2 | 1/2018 | Eberlein et al. | |
| 10,452,646 B2 | 10/2019 | Schlarb et al. | |
| 10,491,700 B2 | 11/2019 | Eberlein | |
| 11,269,717 B2 | 3/2022 | Eberlein et al. | |
| 11,537,364 B2 | 12/2022 | Eberlein et al. | |
| 11,609,829 B2 | 3/2023 | King et al. | |
| 2007/0198602 A1* | 8/2007 | Ngo | G06F 16/27 |
| 2015/0088823 A1* | 3/2015 | Chen | G06F 16/273 |
| | | | 707/626 |
| 2018/0121453 A1* | 5/2018 | Jain | G06F 16/13 |
| 2020/0120130 A1* | 4/2020 | McArdle | G06F 9/4406 |
| 2022/0019505 A1* | 1/2022 | Lee | G06F 11/1016 |

(Continued)

OTHER PUBLICATIONS

U.S. Appl. No. 18/209,234, filed Jun. 13, 2023, Eberlein.

(Continued)

*Primary Examiner* — Matthew M Kim
*Assistant Examiner* — Indranil Chowdhury
(74) *Attorney, Agent, or Firm* — Fish & Richardson P.C.

(57) ABSTRACT

Methods, systems, and computer-readable storage media for restoring microservice persistencies. A disruptive event potentially affecting a computing system functionality and data synchronization of one or more applications and one or more microservices is determined. Each application and microservice stores respective data records in separate data tables. A restoration of the computing system functionality is determined. A synchronization process is initiated by using a synchronization identification engine. Data record synchronization is verified across a plurality of data tables, by matching record identifiers according to a call mapping between the applications and the microservices. The data record synchronization is restored across the plurality of data tables. An access to the applications and the microservices is reactivated.

20 Claims, 6 Drawing Sheets

(56) References Cited

U.S. PATENT DOCUMENTS

2023/0109280 A1    4/2023  Eberlein et al.
2023/0177018 A1*  6/2023  Wang .................. G06F 11/1658
                                                              707/610

OTHER PUBLICATIONS

Help.sap.com [online], "Recover a Tenant Database to a Point in Time" Mar. 2023, retrieved on Feb. 26, 2024, retrieved from URL <https://help.sap.com/docs/SAP_HANA_COCKPIT/afa922439b204e9caf22c78b6b69e4f2/7a9b18d9d6584c11ba6139e8994c796e.html>, 4 pages.

Help.sap.com [online], "Recover Data Statement (Backup and Recovery)" Nov. 2016, retrieved on Feb. 26, 2024, retrieved from URL <https://help.sap.com/docs/SAP_HANA_PLATFORM/4fe29514fd584807ac9f2a04f6754767/93637a07e3b544398aa02de1541b903c.html?version=2.0.00&locale=en-US>, 3 pages.

* cited by examiner

FIG. 3A

SYNCHRONIZATION IDENTIFICATION TABLE OF APPLICATION 302

| SyncID 310A | How to find changes 312A | Communication flow 314A |
|---|---|---|
| 6237 4329 | delete..., update... | * → A |
| 9346 7876 | insert... | * → B, * → C |
| ~~5435879~~ | update... | * → B, * → C |
| ~~1245383~~ | update... | |
| ~~6234676~~ | delete..., insert... | * → A, * → B |

SYNCHRONIZATION IDENTIFICATION TABLE OF SECOND SERVICE 306

| SyncID 310C | How to find changes 312C | Communication flow 314C |
|---|---|---|
| 9346 7876 | insert..., update... | App → * |
| ~~5435879~~ | update... | App → * |
| ~~6234676~~ | delete..., update... | App → * |

SYNCHRONIZATION IDENTIFICATION TABLE OF FIRST SERVICE 304

| SyncID 310B | How to find changes 312B | Communication flow 314B |
|---|---|---|
| 6237 4329 | delete... | App → * |
| 4341 5565 | update... | * → C |
| ~~8624678~~ | update... | App → * |
| ~~8435429~~ | update... | * → C |

SYNCHRONIZATION IDENTIFICATION TABLE OF THIRD SERVICE 308

| SyncID 310D | How to find changes 312D | Communication flow 314D |
|---|---|---|
| 4341 5565 | delete... | A → * |
| 9346 7876 | update... | App → * |
| ~~5435879~~ | update... | App → * |
| ~~8435429~~ | delete... | A → * |

CONSISTENT RESTORE ACROSS MICROSERVICE PERSISTENCIES

TECHNICAL FIELD

The present disclosure relates to restoring of microservice persistencies.

BACKGROUND

Applications built in a microservice architecture can use a (large) set of microservices (or "services"). The main application itself and most of the respective microservices can use separate databases or other persistencies for data storage. The databases can be set up with a backup and restore capability, to enable data recovery, in case of a disruptive event occurrence. The disruptive events can include situations where a complete data center goes offline, hardware components (e.g., a storage disk) fail, software problem(s) are identified, data is erroneously deleted from one or more databases, a ransomware attack is identified, or access to one or more databases is disabled.

SUMMARY

Implementations of the present disclosure are directed to restoring of microservice persistencies. More particularly, implementations of the present disclosure are directed to management of consistent restoring of microservice persistencies.

In some implementations, a computer-implemented method includes: determining, by one or more processors, a disruptive event potentially affecting a computing system functionality and data synchronization of one or more applications and one or more microservices, each of the one or more applications and of the one or more microservices storing respective data records in separate data tables, determining, by the one or more processors, a restoration of the computing system functionality, initiating, by the one or more processors, a synchronization process by using a synchronization identification engine, verifying, by the one or more processors, data record synchronization across a plurality of data tables, by matching record identifiers according to a call mapping between the one or more applications and the one or more microservices, restoring, by the one or more processors, the data record synchronization across the plurality of data tables, and reactivating, by the one or more processors, an access to the one or more applications and to the one or more microservices.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations including determining a disruptive event potentially affecting a computing system functionality and data synchronization of one or more applications and one or more microservices, each of the one or more applications and of the one or more microservices storing respective data records in separate data tables, determining a restoration of the computing system functionality, initiating a synchronization process by using a synchronization identification engine, verifying data record synchronization across a plurality of data tables, by matching record identifiers according to a call mapping between the one or more applications and the one or more microservices, restoring the data record synchronization across the plurality of data tables, and reactivating an access to the one or more applications and to the one or more microservices.

The present disclosure also provides a computer-readable storage medium coupled to one or more processors and having instructions stored thereon which, when executed by the one or more processors, cause the one or more processors to perform operations including determining a disruptive event potentially affecting a computing system functionality and data synchronization of one or more applications and one or more microservices, each of the one or more applications and of the one or more microservices storing respective data records in separate data tables, determining a restoration of the computing system functionality, initiating a synchronization process by using a synchronization identification engine, verifying data record synchronization across a plurality of data tables, by matching record identifiers according to a call mapping between the one or more applications and the one or more microservices, restoring the data record synchronization across the plurality of data tables, and reactivating an access to the one or more applications and to the one or more microservices.

The foregoing and other implementations can each optionally include one or more of the following features, alone or in combination. In particular, implementations can include all the following features: The disruptive event includes a loss of access to a data center, a hardware failure, a data storage failure, a software error, an erroneous delete operation part of a data record portion, or a malicious attack. The separate data tables are populated with data records in response to detecting a change to at least one application of the one or more applications or to at least one microservice of the one or more microservices. Restoring, by the one or more processors, the data record synchronization across the plurality of data tables includes deleting at least one data record or regenerating the at least one data record. The record identifiers are matched in an inversed chronological order. The data record synchronization includes recursive synchronizations initiated from one application to respective microservices. The record identifiers include numerical or alphanumerical identifiers. The computer-implemented method further includes generating, by the one or more processors, a report indicating data records modified by the data record synchronization across the plurality of data tables. The computer-implemented method further includes executing, by the one or more processors, an additional data record synchronization across the plurality of data tables. The data record synchronization is prioritized based on record scopes.

These and other implementations can each optionally include one or more of the following advantages. Disruptive events are being monitored and the identification of a potential a disruptive event automatically triggers verification of data record consistency across separate databases or other persistencies for data storage, which minimizes or eliminates corrupted and inconsistent data records. Backup processes for synchronization of a set of databases used by an application and a set of microservices used by the application can be efficiently restored to a particular point-in-time, minimizing the amount of data loss. The consistency across different databases is efficiently checked and access to an application and the respective microservices can be improved. Inconsistencies can be dynamically and interactively listed to provide mechanisms to selectively roll-back the databases status of individual microservices to a state, which is consistent through the set of databases. The approach can be implemented on application level and can be integrated in different database types and other persistencies, such that consistency of backups can be implemented across distributed database instances. The described enhanced implementations facilitate using database types specialized for particular microservice types, independent of the respective backup and restore capabilities and schedules. For example, the enhanced approach facilitates restoring a consistent copy of the application database set to be used for example for testing, development, problem root cause analysis or other application and/or microservice related operations.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3A depicts an example of data record synchronization of tables in accordance with implementations of the present disclosure.

Like reference symbols in the various drawings indicate like elements.

DETAILED DESCRIPTION

Figure 1:
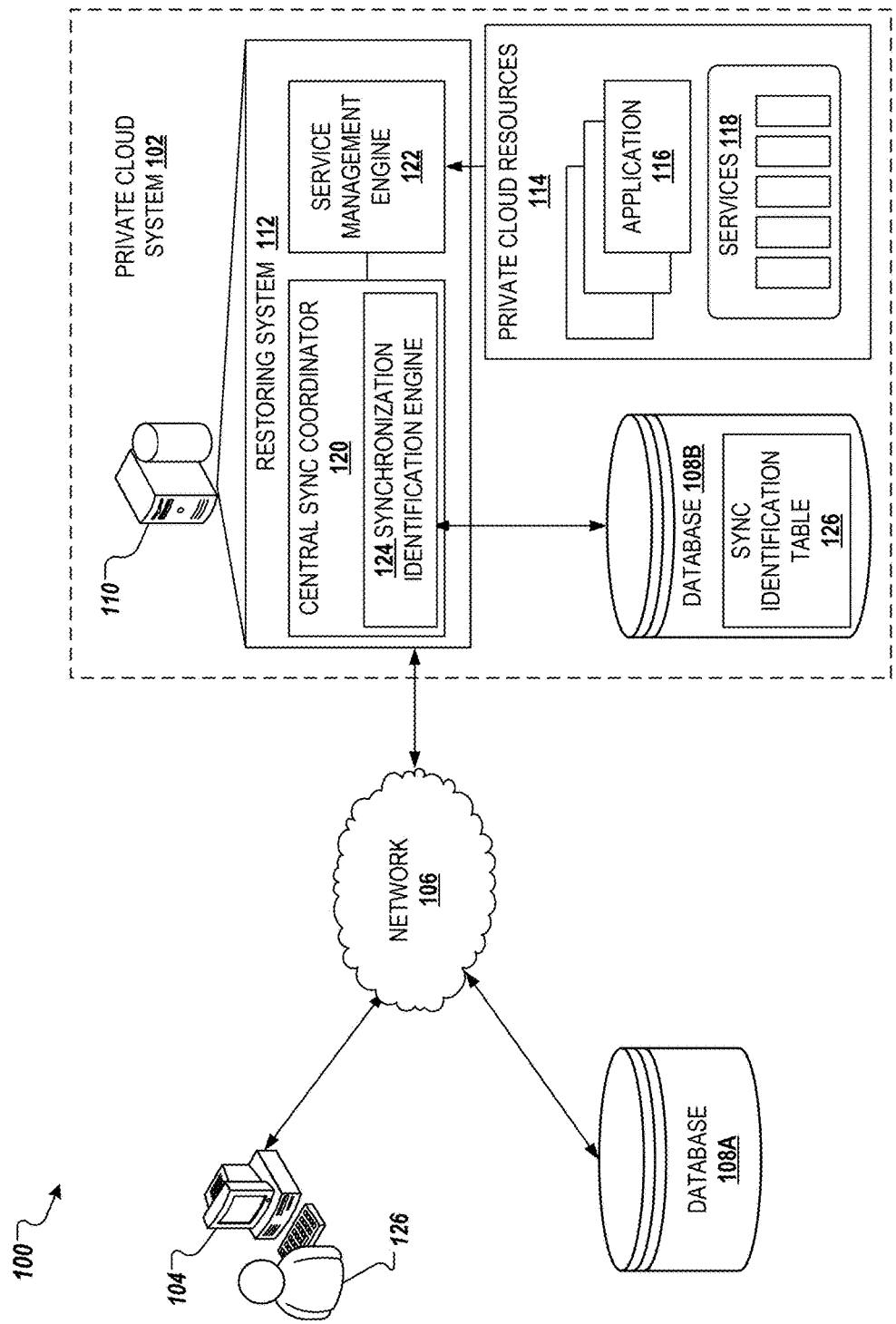
FIG. 1 depicts an example high-level system architecture in accordance with implementations of the present disclosure.

Implementations of the present disclosure are directed to restoring of microservice persistencies. More particularly, implementations of the present disclosure are directed to management of consistent restoring of microservice persistencies automatically triggered by identification of a disruptive event affecting a main application and/or one or more related microservices. The main application itself and at least a portion of the related microservices can use separate databases or other persistencies to store data records. Even if the disruptive event affects only one microservice or one of the separate databases or other persistencies, verification of data record synchronization across data tables stored by the separate databases can be initiated after a restoration of the computing system functionality. The verification results can be used to initiate a synchronization process by using a synchronization identification engine to restore the data record synchronization across the data tables and to reactivate access to the application and the respective microservices.

The backup and restore methodology configured for the database instances of the different microservices can be heterogeneous, especially, if different database types are used. For example, a microservice may configure a full backup or snapshot of the database according to a set schedule (e.g., every day at 12 AM, keeping re-do logs in between, and additionally performing data file replication of full and incremental backups every 15 minutes to a remote data center). The backup of another microservice can be configured once a day as well, but if the microservice runs in another remote data center, it might be configured to run at a different local nighttime. A microservice with low change volume may configure data file replication of incremental backup with a particular frequency (e.g., not every 15 min but every 30 minutes). The backup time and data file replication times are typically asynchronous. Generally, the backups of database instances used by an application "App" and the respective microservices A, B, and C, are typically, non-simultaneous and the incremental backup data files are also not replicated synchronously. For restoring data record synchronization, a set of backups for the impacted database instances is selected, from a small range of time. The restored backups can reflect the state of the data of application App and the respective microservices A, B, and C at different time points that might be inconsistent. If the incremental backup files ("re-do logs") to execute a point-in-time-recovery (PITR) are available (and the database types offer similar recovery features), a PITR can be run for the backups and a more consistent restore of the super-set of the databases used by the App and the respective microservices can be achieved. Systems including PITR mechanisms can still generate inconsistently restored data records written by the different microservices that might be incompatible and can present a latency between one microservice calling another microservice, and delays in completing the transaction within a microservice.

Addressing the limitations of traditional restoring mechanisms, the approach described in the present disclosure provides optimized and consistent restore of a set of databases or other persistencies used by one application and the respective microservices. The approach is designed in the application layer, enabling the use of a heterogeneous set of persistencies with individual configuration of the respective backup strategies. Implementations of the present disclosure provide an automated mechanism to identify inconsistencies using a synchronization identification engine for consistently restoring database instances to a similar point-in-time. Another advantage of the described implementations includes full recursive synchronizations from the App down to all related microservices. Further advantages of the recursive synchronization are described in detail with reference to FIGS. 1-2, 3A-3B, and 4-5.

FIG. 1 depicts an example system 100 in accordance with implementations of the present disclosure. In the depicted example, the example system 100 includes a private cloud system 102, one or more user devices 104, a network 106, and a database 108A. Although shown separately, in some implementations, functionality of two or more components of the example system 100 or the private cloud system 102 can be provided by a single system or server. In some implementations, the functionality of one illustrated example system 100, server, or component can be provided by multiple systems, servers, or components, respectively.

The private cloud system 102 includes one or more server devices 110 hosting a restoring system 112, a database (e.g., processors, memory) 108B, and private cloud resources 114 including one or more applications 116 and one or more microservices 118. The restoring system 112 includes a central synchronization coordinating system 120 and a microservice management engine 122. The central synchronization coordinating system 120 includes a synchronization identification engine 124.

In the depicted example, a user 126 interacts with the user device 104 for accessing the one or more applications 116 and the one or more microservices 118 provided by the private cloud system 102. In an example context, the user 126 can include users (e.g., enterprise operators and maintenance agents) who interact with one or more data analytics systems hosted by the private cloud system 102. In private cloud platforms, the user 126 can perform operations, which can be referred to as information technology (IT) operations, for the administration of the private cloud system 102. In some examples, user 126 are provided with global credentials within the private cloud system 102 that uniquely identifies the user 126 within the private cloud system 102. In some examples, each of the user 126 can be assigned to one or more roles, each role having a set of privileges representing operations that the respective user 126 is allowed to perform. In some examples, the user 126 can be assigned to one or more groups, each group having a set of permissions representing operations that users, who are members of the group, are allowed to perform (e.g., one or more roles can be assigned to a group and members of the group inherit the one or more roles). For example, and without limitation, a user 126 can be included in an administrator group that includes administrator privileges (e.g., root privileges) that enable the user 126 (e.g., as an administrator) to execute operations within the private cloud system 102, such as providing an authorization for synchronization operations including deleting at least one data record or regenerating the at least one data record.

In some examples, the user devices 104 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, the user devices 104 can communicate with the private cloud system 102 over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In the example of FIG. 1, the server device 110 is intended to represent various forms of servers including, but not limited to a web server, an application server, a proxy server, a network server, and/or a server pool. In general, server systems accept requests for application microservices and provides such microservices to any number of user devices (e.g., the user devices 104 over the network 106).

The databases (e.g., processors, memory) 108A, 108B can include any type of database module and persistencies that can take the form of volatile and/or non-volatile memory including, without limitation, magnetic media, optical media, random access memory (RAM), read-only memory (ROM), removable media, or any other suitable local or remote memory component. The databases (e.g., processors, memory) 108A, 108B can store various data records for one or more applications 116 and microservices 118. For example, the databases 108A, 108B can store objects or data, including caches, classes, frameworks, applications, backup data, application objects, jobs, web pages, web page templates, database tables, database queries, repositories storing application data and/or dynamic information, and any other appropriate information including any parameters, variables, algorithms, instructions, rules, constraints, or references thereto associated with the purposes of the private cloud system 102. The databases 108A, 108B can be homogeneous such that all microservices related to an application use an in-memory database (e.g., SAP HANA, provided by SAP SE of Walldorf, Germany). In some implementations, the microservices 118 can use heterogeneous databases 108A, 108B (e.g., a first portion of the microservices use a first database 108A and a second portion of the microservices use a second database 108B) of different types or vendors. Examples of heterogeneous databases 108A, 108B include specialized databases like graph databases, vector databases, time-series databases or other database types related to particular microservice functions. In some implementations, other forms of persistencies can be used, like for example object datastores.

The restoring system 112 can provide restoring commands that can restore data synchronization across different databases 108A, 108B for providing data record consistency for the private cloud resources 114 of the private cloud system 102. The private cloud resources 114 represent resources that are provisioned within the private cloud system 102 for use by the user devices 104 that can be affiliated with an entity (e.g., an organization). Example resources can include, without limitation, database systems, applications, servers, physical machines, virtual machines, containers, and the like. In some examples, the restoring mechanism for the private cloud resources 114 can be provisioned within the private cloud system 102 and can be adjusted according to synchronization plans and restoring demands from the user devices 104. For example, any administrator-level command that is entered through a Linux console, to a Windows shell, or the like and is transmitted by the user devices 104 to the restoring system 112, is directed to the synchronization identification engine 124 for dynamically adjusting restoring operations affecting data record synchronization across multiple data tables separately stored by the databases 108A, 108B.

The synchronization identification engine 124 executes synchronization processes for each application 116 and microservices 118 (e.g., services configured to execute particular functions) the application 116 uses. The synchronization identification engine 124 provides a database table, a synchronization identification table 128, for each application 116 and microservice 118. The synchronization identification table 128 is populated with data on every change done to the application 116 and related microservice(s) 118. If the application 116 or a microservice 118 for a particular action does not only write data to the respective database 108B but also calls another microservice, the changes done to the local database 108B are stored in the synchronization identification table 128. For example, a synchronization identifier is created for retrieving the before-state of the records to be modified in the database 108B. A change entered in the local database 108B is identified as an entry written in the synchronization identification table 128 including the synchronization identifier, a restoring operation (e.g., action to undo the change using the captured before state), and a set of microservices 118 being called by the restoring operation. The synchronization identifier is passed with the call to the remote microservices. The called microservices act as the calling app: they capture the before-state of the records to be modified, and store in the synchronization identification table 128, the received synchronization identifier, the action how to undo the change and the microservice 118 or application 116 having called with the synchronization identifier. The synchronization process can include changes to the data records stored in the local database 108B and the external database 108A. The changes applied for data record synchronization can be listed in synchronization records that can be stored by the local database 108B and/or the external database 108A. In response to restoring the data records, together with the data, the synchronization records, undo information and called microservices 118 are available.

For a restore, the set of instances of databases 108A, 108B are restored to a similar point-in-time. The central synchronization coordinating system 120 calls the synchronization identification engine 124 in the application 116 to check and correct the data record consistency. The synchronization identification engine 124 is called in the application (App) 116. The application 116 includes a configuration of each microservice 118 that is called (and credentials to call the respective microservice). For the check and correct call, the application 116 calls each microservice 118 in the list of configured microservices 118. If there is a microservice 118, which is not directly called by the application 116, but indirectly by one of the microservices 118, the indirectly called microservice is identified during a check and correct action within the microservice calling it such that data records of all related microservices are verified and restored to ensure correct synchronization. In response to determining that a complete recursive synchronization from the application 116 down to all (directly and indirectly) related microservices has been completed, the central synchronization coordinating system 120 checks if another synchronization round is required. Additional synchronization operations can be triggered by an identification of a downstream synchronization partner became unsynchronized with an upstream communication partner after the synchronization partners had already synced. The downstream synchronization partner can request another round of synchronization operations to be executed by the central synchronization coordinating system 120. In response to receiving, the request for additional synchronization operations, the central synchronization coordinating system 120 can initiate a second synchronization process. In response to completing the second synchronization process without receiving another request for any other synchronization operations, the synchronization process is completed. Otherwise, the synchronization process can be repeated until no further inconsistencies remain. Further details regarding the central synchronization coordinating system 120 are described with reference to FIG. 2 and additional details regarding the synchronization process are described with reference to FIGS. 2-4.

Figure 2:
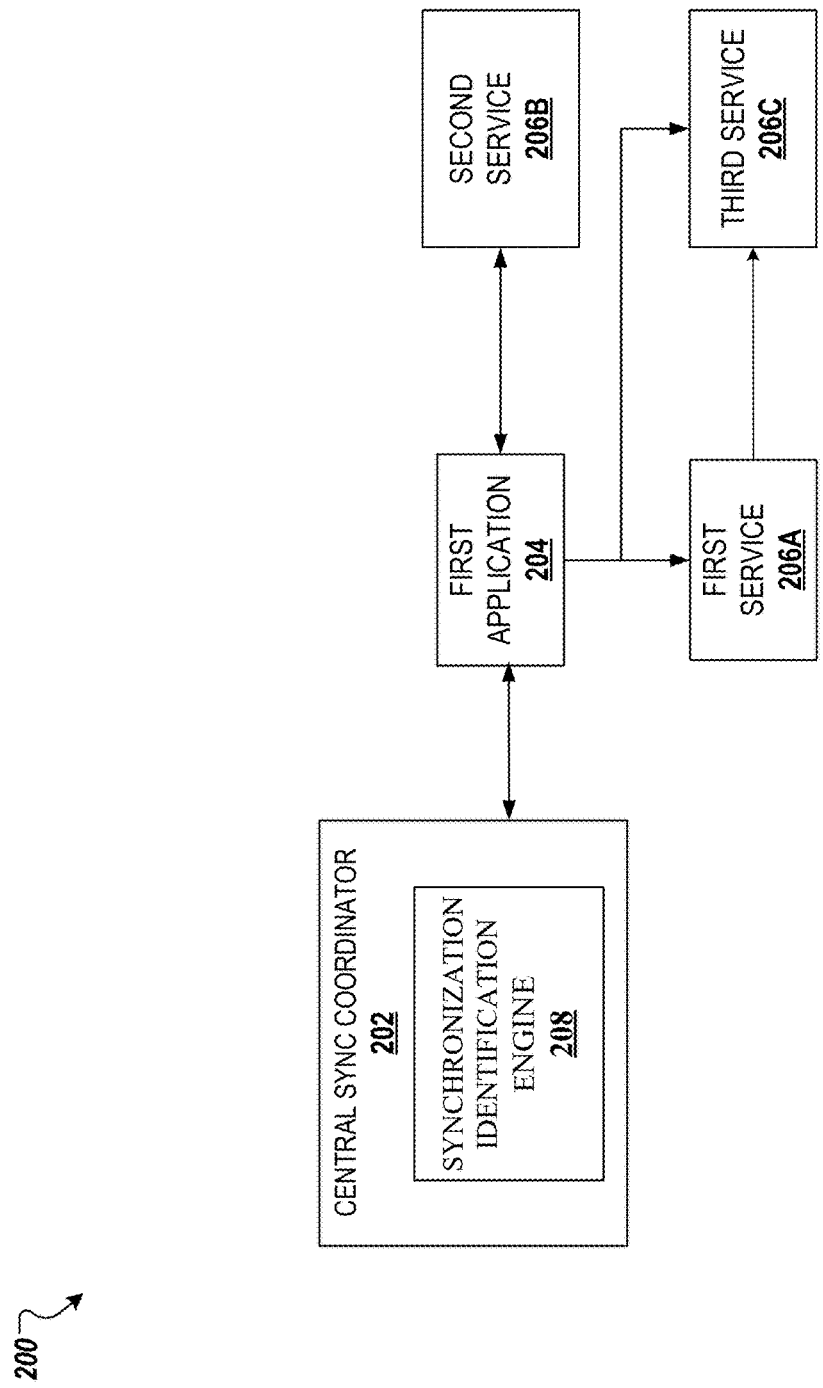
FIG. 2 is a block diagram of an example microservice application, for which data records can be synchronized in accordance with implementations of the present disclosure.

FIG. 2 is a block diagram of an example microservice application 200, for which data records can be synchronized in accordance with implementations of the present disclosure. The example microservice application 200 includes one or more of the components of the example architecture 100 described with reference to FIG. 1. For example, the example microservice application 200 includes a central synchronization coordinating system 202 (e.g., central synchronization coordinating system 120 described with reference to FIG. 1), an application 204 (e.g., application 116 described with reference to FIG. 1), a first microservice 206A (e.g., microservice 118 described with reference to FIG. 1), a second microservice 206B (e.g., microservice 118 described with reference to FIG. 1), and a third microservice 206C (e.g., microservice 118 described with reference to FIG. 1).

The central synchronization coordinating system 202 can include a synchronization identification engine 208 (e.g., the synchronization identification engine 124 described with reference to FIG. 1). The central synchronization coordinating system 202 can perform synchronization operations for each of the applications 204 and the related microservices 206A, 206B, 206C. In the example illustrated in FIG. 2, the application 204 calls microservices 206A, 206B, 206C, and the first microservice 206A also calls the third microservice 206C. The call can be a representational state transfer (REST) call to the platform microservice. The application 204 can provide a gateway between a command line interface of a user device (e.g., the user device 104 described with reference to FIG. 1) and the microservices 206A, 206B, 206C implementing the actual command functionality. The application 204 can provide a mapping between data records used as input or generated as output by the microservices 206A, 206B, 206C. In some implementations, the application 204 can provide a server-side microservice provider plug-in interface to perform more complex operations for a platform microservice that does not provide an application programing interface of the platform microservice that can be mapped to or that may require additional logic to be implemented outside of the platform microservice itself.

The synchronization identification engine 208 includes a persistency in each database for each application 204 and the related microservices 206A, 206B, 206C. For example, the synchronization identification engine 208 includes a persistency of each microservice 206A, 206B, 206C during writing operations to the database being executed by the microservices 206A, 206B, 206C. The persistency is or can include a database table (e.g., synchronization identification table 128 described with reference to FIG. 1 or tables 302, 304, 306, 308 described with reference to FIGS. 3A and 3B). The persistency reflects the mapping between data records. The mapping between the data records can be used to verify data record synchronization and to restore the data record synchronization according to a sequence of the application and microservice calls. For example, the central synchronization coordinating system 202 can initiate the synchronization process by calling the synchronization identification engine 208 to check and correct data records of the database instance of the application 204 in inversed chronological order (e.g., by reading the latest available record in the synchronization identification table). The consistency of the data records of the of the application 204 with the data records of the of the first microservice 206A and the data records of the of the second microservice 206B is verified. The consistency verification of the data records of the of the application 204 with the data records of the of the first microservice 206A sequentially triggers verification of consistency of the data records of the of the first microservice 206A with the data records of the of the third microservice 206C.

Figure 3B:
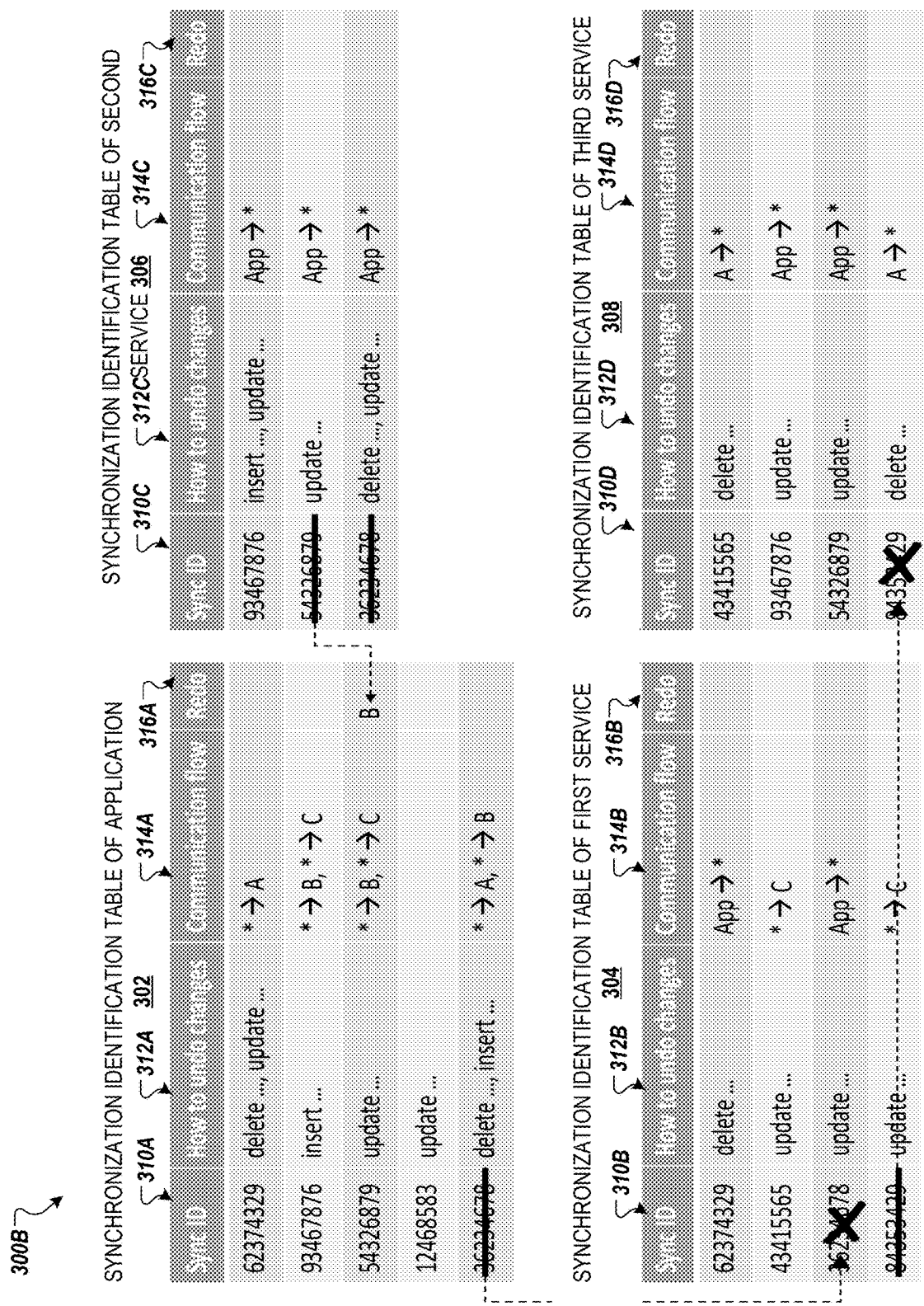
FIG. 3B depicts another example of data record synchronization of tables in accordance with implementations of the present disclosure.

FIGS. 3A and 3B depict examples of data record synchronization 300A, 300B of tables in accordance with the example application that is related to multiple (three) microservices, as described with reference to FIG. 2. The data record synchronization 300A, 300B, as shown in FIGS. 3A and 3B, can be performed by verifying consistency of data records across multiple synchronization identification tables 302, 304, 306, 308. The synchronization identification table 302 can include data records of an application. The synchronization identification tables 304, 306, 308 can include data records of microservices related to (called by) the application.

The synchronization identification tables 302, 304, 306, 308 can be formatted to include multiple (e.g., three) columns. For example, identification table 302, 304, 306, 308 can include a first column 310A, 310B, 310C, 310D storing the unique synchronization identifier. The unique synchronization identifier can be a unique identifier, e.g., be an alphanumeric or numeric globally unique identifier (e.g., a 128-bit number or 256-bit number). For example, the unique synchronization identifier can include a sequence of characters or numbers (e.g., "54326879"). The synchronization identification tables 302, 304, 306, 308 can include a second column 312A, 312B, 312C, 312D storing restore operation identifiers (e.g., undo-information). The restore operation identifiers 308 can include an insert operation, a delete operation, and/or an update operation. The insert operation can be identified by an inserted key. The update operation can include a modification operation with a key of a data record being modified. The delete operation can include an insert operation with the deleted key and the read values of a respective row. Undo information can be present for more than one database table. Different statements can be used for different related tables (e.g., insert data records in a first table and delete from a second related table). The changes done in one database transaction can be captured under one unique synchronization identifier and for all changes an undo operation is stored in a respective unique synchronization identifier table. The synchronization identification tables 302, 304, 306, 308 can include a third column 314A, 314B, 314C, 314D storing a "communication flow" identifying microservices being called or source of call (indicating the application as initiating the call of a respective microservice) leading to the data record. The "communication flow" can be outgoing: "a first (A) microservice" calls a second (B) or third (C) microservice.

For example, for synchronization identifier "54326879" the record in the synchronization identification table 302 of the application (e.g., application 204 described with reference to FIG. 2), specifies calls to second (B) microservice (e.g., microservice 206B described with reference to FIG. 2) and the third (C) microservice (e.g., microservice 206C described with reference to FIG. 2). In the related data record for synchronization identifier "54326879" in the synchronization identification table 306 of the second (B) microservice, an incoming call from the application is indicated and in the related data record for synchronization identifier "54326879" in the synchronization identification table 308 of the third (C) microservice, an incoming call from the application is also indicated. The synchronization identification tables 302, 304, 306, 308 can include a timestamp field or an implicit mechanism (e.g., inclusion of a temporal identifier in the synchronization identifier) facilitating to read the data records in reverse order from latest to newer, using a sequence of synchronization operations.

If the set of database instances for the application is restored from a backup, the synchronization identification tables 302, 304, 306, 308 such as shown in the example in FIG. 3A the databases of the application and of the related microservices (A, B, and C) can be restored. Restore data records to an earlier point-in-time can lead to loss of data compared to the state when the problem occurred. The examples depicted in the FIG. 3A as data records being deleted (lost) during the synchronization process of the synchronization identification tables are illustrated as being stroked through. The check and correct process after restoring can include a verification operation and a correction operation that can be triggered by the central synchronization coordinating system (e.g., central synchronization coordinating system 202 described with reference to FIG. 2) calling the synchronization identification engine (e.g., synchronization identification engine 208 described with reference to FIG. 2) with the database instance of the application. The synchronization identification engine checks consistency of the application data records with the first microservice. The synchronization identification engine calls the first microservice and passes the respective last known synchronization identifier with first microservice, which can be a first data record (62/374,329) if a second data record (36234678) was lost by the restore to the application. The first microservice has the sent synchronization identifier 62374329 in the respective synchronization identifier-table 304 and can reply by providing the respective synchronization identifier. The first microservice can have a newer synchronization identifier (36234678), but if a corresponding data record is missing from the application synchronization identifier-table 302, the synchronization identification engine executes an undo operation locally for the first microservice and removes the record from the synchronization identifier-table of the first microservice 304.

As another example illustrated in FIG. 3A, the synchronization identification engine of synchronizes the data records of the first microservice with the data records of the third microservice. The synchronization identification engine calls the third microservice and passes its last known synchronization identifier to the third microservice, which is 43415565 because record 84353429 was lost by the restore to first microservice. The third microservice has the sent synchronization identifier 43415565 in the respective synchronization identifier-table 308 and can reply to provide the synchronization identifier. The third microservice can include a newer synchronization identifier (84353429), that can be lost by the first microservice (missing from the synchronization identifier-table 304 of the first microservice due to restore). For the lost synchronization identifier (84353429) the synchronization identification engine of third microservice executes an undo operation locally and removes the record from the synchronization identifier-table 308 of the third microservice.

The application synchronization identification engine can check consistency of application data records with data records of the second microservice. The synchronization identification engine calls the second microservice and passes the respective last known synchronization identifier with second microservice, which in the illustrated example is 54326879. The synchronization identification engine can identify that the second microservice does not have the sent synchronization identifier 54326879 in the respective synchronization identifier-table 306 because this record was lost by the restore to second microservice. The second microservice can return the respective locally last knows synchronization identifier with the application, which is 93467876. In response to determining that the data table of the second microservice fails to include newer synchronization identifier than the application, it is determined that an undo operation is unnecessary to be performed. For synchronizing the data records, the application, upon receiving the response with synchronization identifier 93467876, can undo later operations previously sent to second microservice. The undo operation can include undoing an operation that generated the missing data record with the synchronization identifier 54326879 and, for keeping consistency, all operations thereafter (including in the illustrated case 12468583) are undone.

The application synchronization identification engine can check consistency with the third microservice called using the respective the respective synchronization identifier-table 308. The synchronization identification engine calls the third microservice and passes the respective last known synchronization identifier with third microservice, which is now 93467876, because record 54326879 was removed in the previous step. The synchronization identifier-table 308 of the third microservice includes the sent synchronization identifier 93467876. The third microservice can transmit a response to the synchronization identification engine including the synchronization identifier. The synchronization identifier-table 308 of the third microservice includes a newer synchronization identifier (54326879), but as the application has deleted it, the synchronization identification engine of the third microservice locally initiates an undo operation and removes the record from the respective synchronization identifier-table 308. The synchronization identification engine can end a synchronization round in response to determining that all data records of all called microservices were verified. In response to determining that synchronization rounds are completed (no further synchronization rounds are requested to synchronize other upstream microservices), the central synchronization coordinating system can end the process and make the application, and the respective related microservices identified as being synchronized and available to be accessed and used by user devices.

As shown in FIG. 3B, the synchronization identification tables 302, 304, 306, 308 can include a fourth column 316A, 316B, 316C, 316D storing redo operation identifiers (e.g., redo-information). The synchronization identification engine can call the second microservice and send the respective last known synchronization identifier with second microservice, which in the illustrated example is 54326879. The synchronization identifier-table 306 of the second microservice misses the sent synchronization identifier 54326879 because the record might be lost by the restore to second microservice. In response to determining the missing data record, the second microservice returns the respective locally last knows synchronization identifier with the application, which is 93467876. In response to determining that the second microservice has no newer synchronization identifier than the application, it is determined that an undo operation is unnecessary to be performed. Although the application, upon receiving the response with synchronization identifier 93467876, detects that second microservice is unsynchronized for record 54326879, an undo operation is not performed, because the respective data record lists second microservice as redo-capable in the fourth column 316A. In response to determining the redo-capability, a redo operation can be triggered to synchronize the data records and get the communication partners in sync. In response to determining the redo-capability, neither 54326879, nor for keeping consistency, any subsequent operations, in this case 12468583, are undone.

Figure 4:
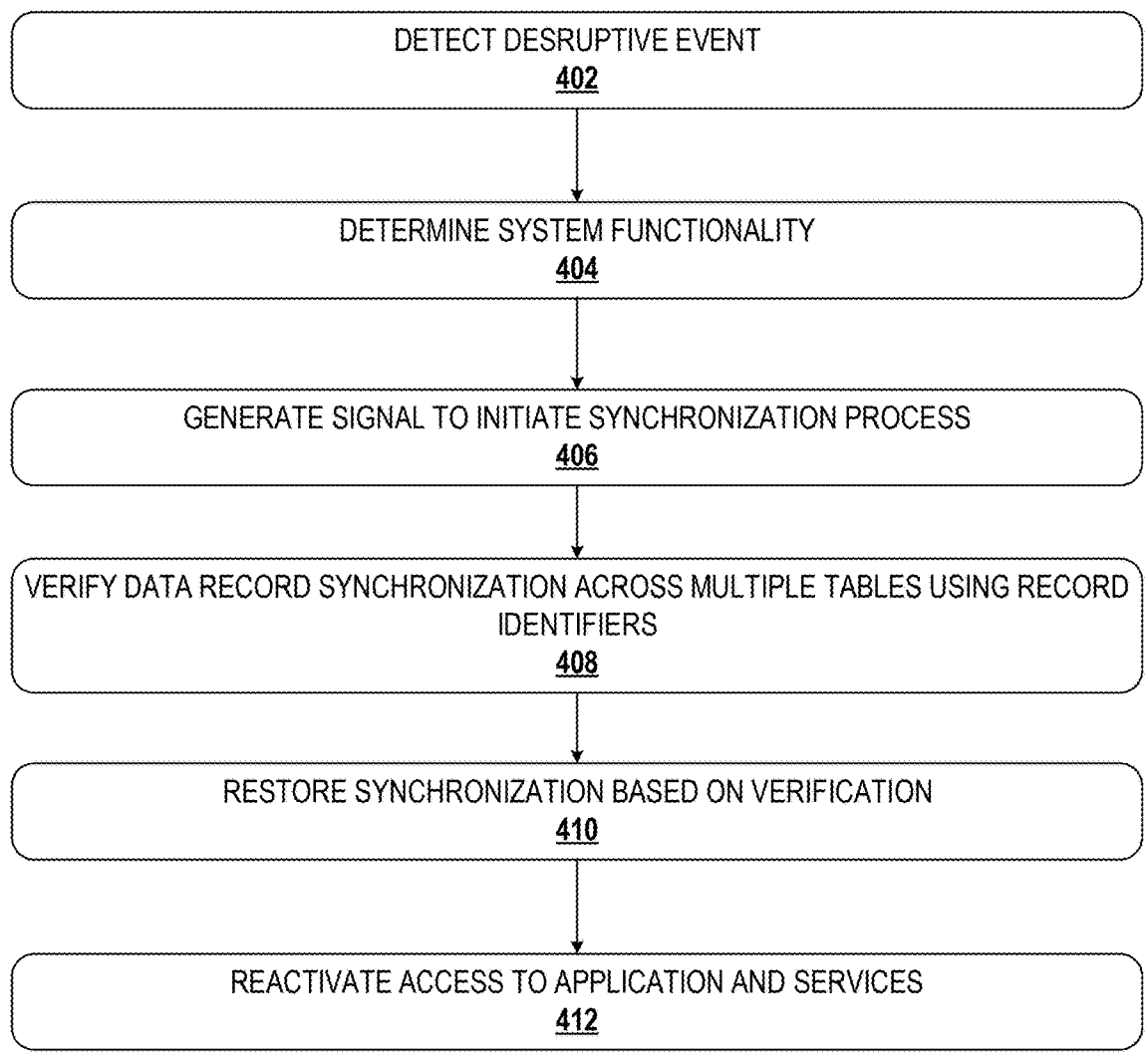
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices, such as a restoring system 112 of the private cloud system 102 described with reference to FIG. 1 or a central synchronization coordinating system 202 of the example system 200 described with reference to FIG. 2.

At 402, a disruptive event is detected. The disruptive event can include any event that can potentially affect a computing system functionality (including data storage functionality) and data synchronization of one or more applications and one or more related microservices that have data records stored approximately simultaneous in separate data tables of a common or separate databases. Examples of the disruptive event can include a complete data center (DC) goes offline (such as, having lost a network connection), local hardware failure (such as, a single disk is corrupted that is storing the data of one database), a software problem, erroneously deleting part of the data in one or more databases, or a ransomware (malware) attack, or any event disabling or disturbing access to one or more databases.

At 404, a restoration of the computing system functionality is determined based on a termination of the disruptive event. The restoration of the computing system functionality can include an operation for restoring the computing system functionality (including data storage functionality) and data synchronization of the one or more applications and the one or more related microservices to facilitate storage of the data records approximately simultaneous in separate data tables of respective databases. Examples of restoration of the computing system functionality can include an identification that the DC that went offline is online, local hardware is available for storing the data records, the ransomware (malware) attack was blocked, any malicious action was disabled, and/or any repair operation to reestablish access to one or more databases for data record synchronization was completed.

At 406, a signal is generated to initiate a synchronization process by using a synchronization identification engine. The signal can be generated by a central synchronization coordinating system that initiates the synchronization process by calling the synchronization identification engine. The central synchronization coordinating system can perform synchronization operations for each of the applications that were potentially affected by the disruptive event and the microservices that re directly or indirectly called by the applications. The call can be a REST call to the platform microservice. The synchronization identification engine. The synchronization identification engine includes a persistency in each database for each application and the related microservices. The persistency can include a data table (e.g., a synchronization identification table 128 described with reference to FIG. 1 or tables 302, 304, 306, 308 described with reference to FIGS. 3A and 3B). The data tables are populated with data records in response to detecting a change to at least one application of the one or more applications or to at least one microservice of the one or more microservices. The data tables reflect the mapping between data records of the application and one or more microservices being called. The mapping between the data records can be used to verify data record synchronization and to restore the data record synchronization according to a sequence of the application and microservice calls.

At 408, data records are verified across multiple data tables using data record identifiers. The data records are verified by the synchronization identification engine that matches record identifiers in an inversed chronological order. The verification process is performed for each communication partner pair ("P1" and "P2") the pair including a call origin (e.g., application or microservice) and a call target (e.g., application or microservice). The synchronization identification engine within "P1" reads the latest available record in the data table. For the latest available read record, the synchronization identifier and the called communication partner (call target) is identified ("P2"). The synchronization identification engine checks if the identified called communication partner P2 also has the synchronization identifier record in the respective data table.

The synchronization identification engine can identify and distinguish between three cases.

Case 1: In response to determining that the identified called communication partner P2 has the same synchronization identifier as the latest record for the respective communication with the call origin P1, the data record is determined as being consistent Case 2: In response to determining that the synchronization identifier is in the local synchronization identifier-table of identified called communication partner P2 and also newer records are identified as being included in the data table with the same communication partner P1, the records are determined as being unsynchronized and all records after the one with the matching synchronization identifier are selected to be undone locally, until the last local synchronization identifier (related to P1) matches the synchronization identifier received from call origin P1. In response to determining that a record to be undone has one or more downstream communication partner(s) stored in the record, for which synchronization had already been performed previously in the respective synchronization round, these are called again to undo their records as well, by starting a synchronization with the last synchronization identifier for the respective communication partner remaining after the undo. In response to determining that a record to be undone has been created by a call from another upstream communication partner, which has already synced the respective latest synchronization identifier with identified called communication partner P2, an additional round of synchronization can be executed after the current round of synchronization is completed. To trigger the additional round of synchronization, the central synchronization coordinating system is called to schedule a further synchronization iteration. The further synchronization iteration can be skipped if the upstream communication partner has not yet synchronized the respective synchronization identifier with the identified called communication partner P2. For example, in response to determining that the record can be undone and deleted from the synchronization identifier-table of P2, synchronization can be determined as completed.

Case 3: A missing entry in the P2 data table can lead to inconsistent follow-up processing. In response to determining that the synchronization identifier is not in the local data table of P2, it is determined that the P2 data table misses at least one record, triggering execution of an undone operation (data record deletion) in the data table of P1. The synchronization is accomplished by reading the latest synchronization identifier in the data table of the communication partner P2, identified based on the call communication with the calling P1, and returning it with the response to the synchronization call from P1. In response to P1 receiving the synchronization identifier from P2, all records later than the synchronization identifier are undone. In response to determining that a record to be undone has one or more downstream communication partner(s) stored in the record, for which synchronization was previously performed in the respective synchronization round, the performed synchronizations are called again to undo the respective records, by starting a synchronization with the last synchronization identifier for the respective communication partner remaining after the undo.

In some implementations, the synchronization of the data records can be delayed. For example, in response to determining that a record to be undone has been created by a call from another upstream communication partner which has already synced the respective latest synchronization identifier with P1, a further full round of synchronization can be executed after the current one has finished. Triggering the respective synchronization, the central synchronization coordinating system is called to schedule a further synchronization iteration. The scheduling can be skipped in response to determining that the upstream communication partner has not yet synchronized the respective synchronization identifier with the P1 as the record can have been undone and deleted from the synchronization identifier-table of P1 during synchronization execution. In response to a communication partner P2 receiving a synchronization call, the synchronization identification engine checks, whether a synchronization was already performed with the respective downstream communication partners. In response to determining that synchronization was not performed, the synchronization identification engine starts the respective synchronizations. On further synchronization calls from upstream partners, additional synchronizations are determined as being no longer necessary in the current synchronization round, except for the cases described above (under "plus").

In some implementations, the implementation of data record synchronization can be prioritized based on a ranking of data records according to data record scopes. The data record scopes can define an application or microservice usage (combination of rating and regional or organizational assignment) that has a particular status within a status network and within a particular validity period. The data record scopes can be classified based on a scope type defining a criticality level of data record availability and/or a time frame for accessing the data record. Using the ranking of data records only a portion of the data records (e.g., not all data records) are selected to be synchronized. The ranking of data records can be defined at implementation time, rather than at runtime, when the synchronization actually happens, to leverage the data record ranking for each synchronization. Prioritizing the data record synchronization provides an advantage in saving development effort.

At 410, synchronization is restored based on the verification results. The data record synchronization can include recursive synchronizations initiated from one application to respective called microservices and, if existent, additionally called applications.

Restoring the data record synchronization across the plurality of data tables includes deleting at least one data record or regenerating the at least one data record. The data record synchronization can be optimized to minimize the number of deleted data records after the restoration of the system functionality, by recovering at least a portion of the data records, which are present in the origin data table of P1 and are missing from the data table of the called targets (services) P2.

A portion of the data records can be restored in response to determining that, a data record is included in the data table of a second microservice being called and missing from the data table of the first called microservice. The restoring can be triggered by a redo indicator included in a redo column of the data table. The redo column includes indicators indicating the communication partners, for which a redo instead of an undo is possible if a synchronization identifier is lost at the communication partner. The data records associated to a redo indicator are prevented from being undone and deleted but marked for post-processing after all microservices are fully synchronized. The redo selection indicated by the inclusion of the redo indicator is added to the data table when the respective data record is created. For example, a process to create a follow-up object in a target third microservice can be re-triggered to achieve consistency, then the target third microservice can be exempted from the undo automatism. The redo operations can be fully automated or require manual post-processing of the list of marked synchronization identifier records. Redo capable records can be undone and deleted in response to determining that consistency cannot be reached between P1 and P2 data tables otherwise. For example, in response to determining that data records are selected to be undone because an earlier record is requested to be undone, the undoing operations are executed independent of a potential redo capability of the individual process step.

At 412, in response to determining that cross-data table records are fully synchronized, access to the application and the called microservices is reactivated. Reactivating can include generating a report indicating data records modified by the data record synchronization across the plurality of data tables and transmitting the report to a user device. Reactivating applications and microservices can include enabling a function calling execution of a function of the application and the related microservices and enabling addition of new data records to the data tables to reflect executed functions.

The example process 400 advantageously enables optimized management of synchronization processes. The example process 400 provides an automated mechanism to identify inconsistencies between data records of applications and related microservices. Without an automated mechanism to identify inconsistencies, the task can be very cumbersome and time-consuming. In a recovery situation, the time allocated for recovery is minimized to accelerate access to applications and microservices. The set of recovered database instances that can be used further-on, require consistency to ensure functionality of the applications and related microservices. Identification of data record inconsistencies, during recovery, is essential to avoid corrections during use that can be costly, or the microservice can be degraded, and users of the application can be confronted with these inconsistencies long after the restore had happened. The execution of synchronization across data tables can be improved by automatically executing redo operations, using redo extensions. The benefit of the redo extension remains, that as long as there are no other reasons for the undo, the affected record can be saved from deletion and further reduce data loss while keeping the goal of cross-data table consistency.

Figure 5:
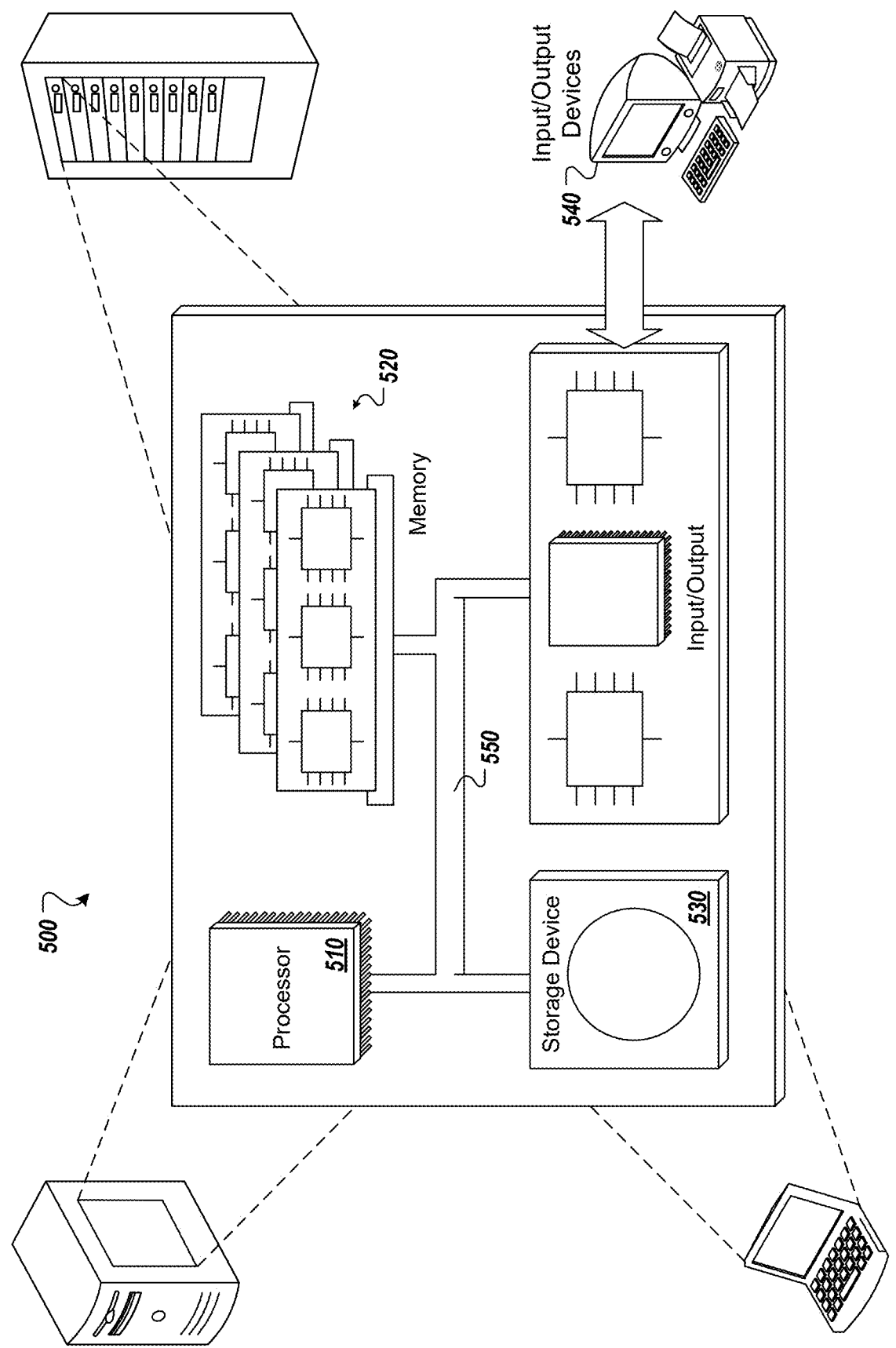
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 can be included in any or all of the server components discussed herein, such as the components of the example architecture 100 described with reference to FIG. 1 and/or components of the example guided backing microservices provisioning system 200, described with reference to FIG. 2. The system 500 includes a processor 510, a memory 520, a storage device 530, and an input/output device 540. The components 510, 520, 530, 540 are interconnected using a system bus 550. The processor 510 is capable of processing instructions for execution of processes (e.g., example process 300 described with reference to FIG. 3) within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 can be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a particular activity or bring about a particular result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: determining, by one or more processors, a disruptive event potentially affecting a computing system functionality and data synchronization of one or more applications and one or more microservices, each of the one or more applications and of the one or more microservices storing respective data records in separate data tables; determining, by the one or more processors, a restoration of the computing system functionality; initiating, by the one or more processors, a synchronization process by using a synchronization identification engine; verifying, by the one or more processors, data record synchronization across a plurality of data tables, by matching record identifiers according to a call mapping between the one or more applications and the one or more microservices; restoring, by the one or more processors, the data record synchronization across the plurality of data tables; and reactivating, by the one or more processors, an access to the one or more applications and to the one or more microservices.

Example 2. The computer-implemented method of the preceding example, wherein the disruptive event comprises a loss of access to a data center, a hardware failure, a data storage failure, a software error, an erroneous delete operation part of a data record portion, or a malicious attack.

Example 3. The computer-implemented method of any of the preceding examples, wherein the separate data tables are populated with data records in response to detecting a change to at least one application of the one or more applications or to at least one microservice of the one or more microservices.

Example 4. The computer-implemented method of any of the preceding examples, wherein restoring, by the one or more processors, the data record synchronization across the plurality of data tables comprises deleting at least one data record or regenerating the at least one data record.

Example 5. The computer-implemented method of any of the preceding examples, wherein the record identifiers are matched in an inversed chronological order.

Example 6. The computer-implemented method of any of the preceding examples, wherein the data record synchronization comprises recursive synchronizations initiated from one application to respective microservices.

Example 7. The computer-implemented method of any of the preceding examples, wherein the record identifiers comprise numerical or alphanumerical identifiers.

Example 8. The computer-implemented method of any of the preceding examples, further comprising: generating, by the one or more processors, a report indicating data records modified by the data record synchronization across the plurality of data tables.

Example 9. The computer-implemented method of any of the preceding examples, further comprising: executing, by the one or more processors, an additional data record synchronization across the plurality of data tables.

Example 10. The computer-implemented method of any of the preceding examples, wherein the data record synchronization is prioritized based on record scopes.

Example 11. A computer-implemented system comprising: memory storing application programming interface (API) information; and a server performing operations comprising: determining a disruptive event potentially affecting a computing system functionality and data synchronization of one or more applications and one or more microservices, each of the one or more applications and of the one or more microservices storing respective data records in separate data tables; determining a restoration of the computing system functionality; initiating a synchronization process by using a synchronization identification engine; verifying data record synchronization across a plurality of data tables, by matching record identifiers according to a call mapping between the one or more applications and the one or more microservices; restoring the data record synchronization across the plurality of data tables; and reactivating an access to the one or more applications and to the one or more microservices.

Example 12. The computer-implemented system of the preceding example, wherein the disruptive event comprises a loss of access to a data center, a hardware failure, a data storage failure, a software error, an erroneous delete operation part of a data record portion, or a malicious attack.

Example 13. The computer-implemented system of any of the preceding examples, wherein the separate data tables are populated with data records in response to detecting a change to at least one application of the one or more applications or to at least one microservice of the one or more microservices.

Example 14. The computer-implemented system of any of the preceding examples, wherein restoring the data record synchronization across the plurality of data tables comprises deleting at least one data record or regenerating the at least one data record.

Example 15. The computer-implemented system of any of the preceding examples, wherein the record identifiers are matched in an inversed chronological order.

Example 16. The computer-implemented system of any of the preceding examples, wherein the data record synchronization comprises recursive synchronizations initiated from one application to respective microservices.

Example 17. The computer-implemented system of any of the preceding examples, wherein the record identifiers comprise numerical or alphanumerical identifiers.

Example 18. The computer-implemented system of any of the preceding examples, further comprising: generating a report indicating data records modified by the data record synchronization across the plurality of data tables; and executing an additional data record synchronization across the plurality of data tables.

Example 19. The computer-implemented system of any of the preceding examples, wherein the data record synchronization is prioritized based on record scopes.

Example 20. A non-transitory computer-readable media encoded with a computer program, the computer program comprising instructions that when executed by one or more computers cause the one or more computers to perform operations comprising: determining a disruptive event potentially affecting a computing system functionality and data synchronization of one or more applications and one or more microservices, each of the one or more applications and of the one or more microservices storing respective data records in separate data tables; determining a restoration of the computing system functionality; initiating a synchronization process by using a synchronization identification engine; verifying data record synchronization across a plurality of data tables, by matching record identifiers according to a call mapping between the one or more applications and the one or more microservices; restoring the data record synchronization across the plurality of data tables; and reactivating an access to the one or more applications and to the one or more microservices.

What is claimed is:

1. A computer-implemented method comprising:
   determining, by one or more processors, a disruptive event potentially affecting a computing system functionality and data synchronization of one or more applications and one or more microservices, each of the one or more applications and of the one or more microservices storing respective data records in separate data tables;
   determining, by the one or more processors, a restoration of the computing system functionality;
   initiating, by the one or more processors, a synchronization process by using a synchronization identification engine;
   verifying, by the one or more processors, data record synchronization across a plurality of data tables, by matching record identifiers according to a call mapping between the one or more applications and the one or more microservices;
   restoring, by the one or more processors, the data record synchronization across the plurality of data tables; and
   reactivating, by the one or more processors, an access to the one or more applications and to the one or more microservices.

2. The computer-implemented method of claim 1, wherein the disruptive event comprises a loss of access to a data center, a hardware failure, a data storage failure, a software error, an erroneous delete operation part of a data record portion, or a malicious attack.

3. The computer-implemented method of claim 2, wherein the separate data tables are populated with data records in response to detecting a change to at least one application of the one or more applications or to at least one microservice of the one or more microservices.

4. The computer-implemented method of claim 3, wherein restoring, by the one or more processors, the data record synchronization across the plurality of data tables comprises deleting at least one data record or regenerating the at least one data record.

5. The computer-implemented method of claim 2, wherein the record identifiers are matched in an inversed chronological order.

6. The computer-implemented method of claim 1, wherein the data record synchronization comprises recursive synchronizations initiated from one application to respective microservices.

7. The computer-implemented method of claim 1, wherein the record identifiers comprise numerical or alphanumerical identifiers.

8. The computer-implemented method of claim 1, further comprising:
   generating, by the one or more processors, a report indicating data records modified by the data record synchronization across the plurality of data tables.

9. The computer-implemented method of claim 1, further comprising:
   executing, by the one or more processors, an additional data record synchronization across the plurality of data tables.

10. The computer-implemented method of claim 1, wherein the data record synchronization is prioritized based on record scopes.

11. A computer-implemented system comprising:
    memory storing application programming interface (API) information; and
    a server performing operations comprising:
    determining a disruptive event potentially affecting a computing system functionality and data synchronization of one or more applications and one or more microservices, each of the one or more applications and of the one or more microservices storing respective data records in separate data tables;
    determining a restoration of the computing system functionality;
    initiating a synchronization process by using a synchronization identification engine;
    verifying data record synchronization across a plurality of data tables, by matching record identifiers according to a call mapping between the one or more applications and the one or more microservices;
    restoring the data record synchronization across the plurality of data tables; and
    reactivating an access to the one or more applications and to the one or more microservices.

12. The computer-implemented system of claim 11, wherein the disruptive event comprises a loss of access to a data center, a hardware failure, a data storage failure, a software error, an erroneous delete operation part of a data record portion, or a malicious attack.

13. The computer-implemented system of claim 12, wherein the separate data tables are populated with data records in response to detecting a change to at least one application of the one or more applications or to at least one microservice of the one or more microservices.

14. The computer-implemented system of claim 13, wherein restoring the data record synchronization across the plurality of data tables comprises deleting at least one data record or regenerating the at least one data record.

15. The computer-implemented system of claim 12, wherein the record identifiers are matched in an inversed chronological order.

16. The computer-implemented system of claim 11, wherein the data record synchronization comprises recursive synchronizations initiated from one application to respective microservices.

17. The computer-implemented system of claim 11, wherein the record identifiers comprise numerical or alphanumerical identifiers.

18. The computer-implemented system of claim 11, wherein the operations further comprise:
   generating a report indicating data records modified by the data record synchronization across the plurality of data tables; and
   executing an additional data record synchronization across the plurality of data tables.

19. The computer-implemented system of claim 11, wherein the data record synchronization is prioritized based on record scopes.

20. A non-transitory computer-readable media encoded with a computer program, the computer program comprising instructions that when executed by one or more computers cause the one or more computers to perform operations comprising:
   determining a disruptive event potentially affecting a computing system functionality and data synchronization of one or more applications and one or more microservices, each of the one or more applications and of the one or more microservices storing respective data records in separate data tables;
   determining a restoration of the computing system functionality;
   initiating a synchronization process by using a synchronization identification engine;
   verifying data record synchronization across a plurality of data tables, by matching record identifiers according to a call mapping between the one or more applications and the one or more microservices;
   restoring the data record synchronization across the plurality of data tables; and
   reactivating an access to the one or more applications and to the one or more microservices.

* * * * *